Jan. 16, 1962 C. C. CROWELL 3,016,954
WIRE LINE FISHING TOOL
Filed Nov. 18, 1957 3 Sheets-Sheet 3

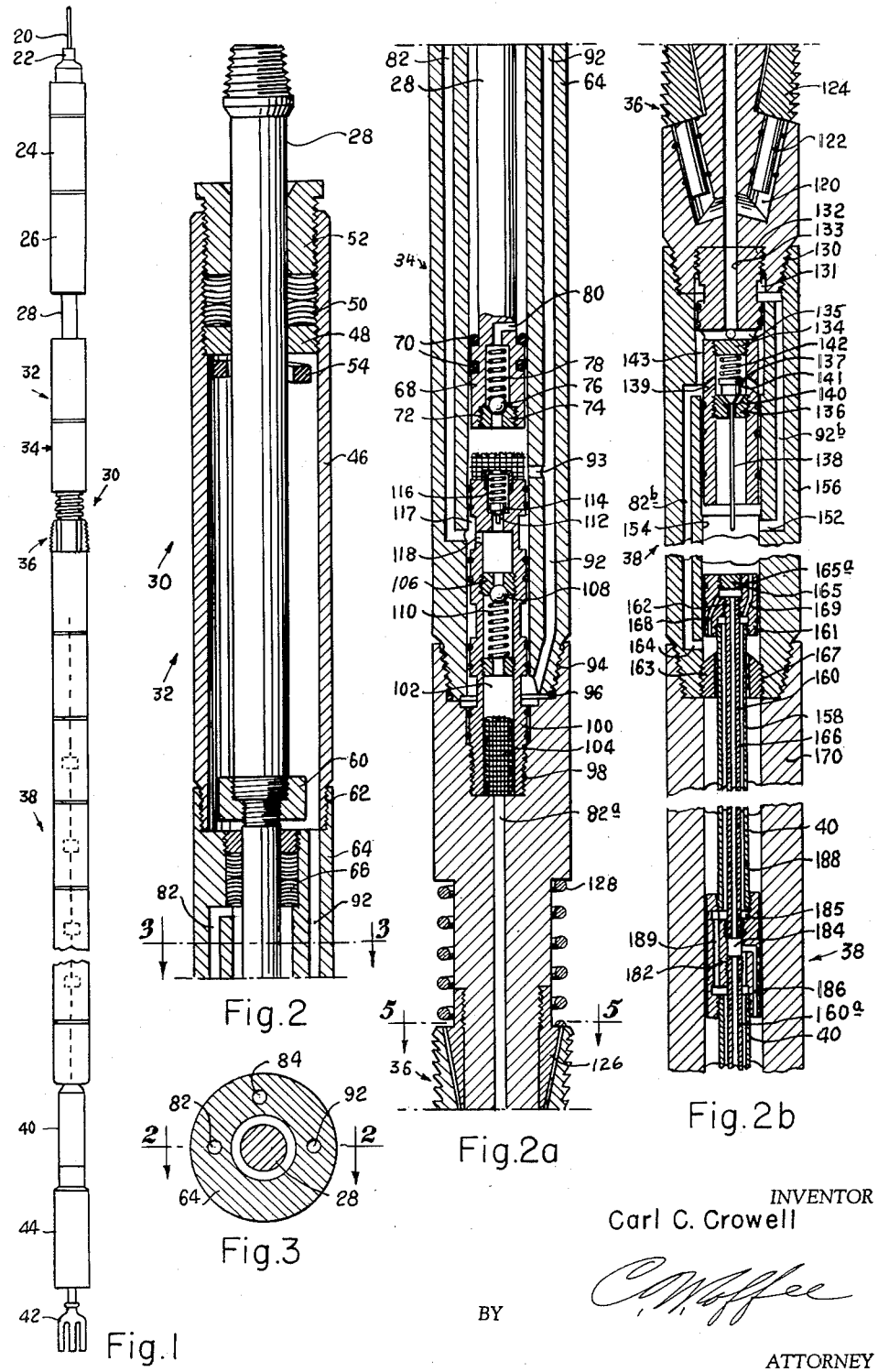

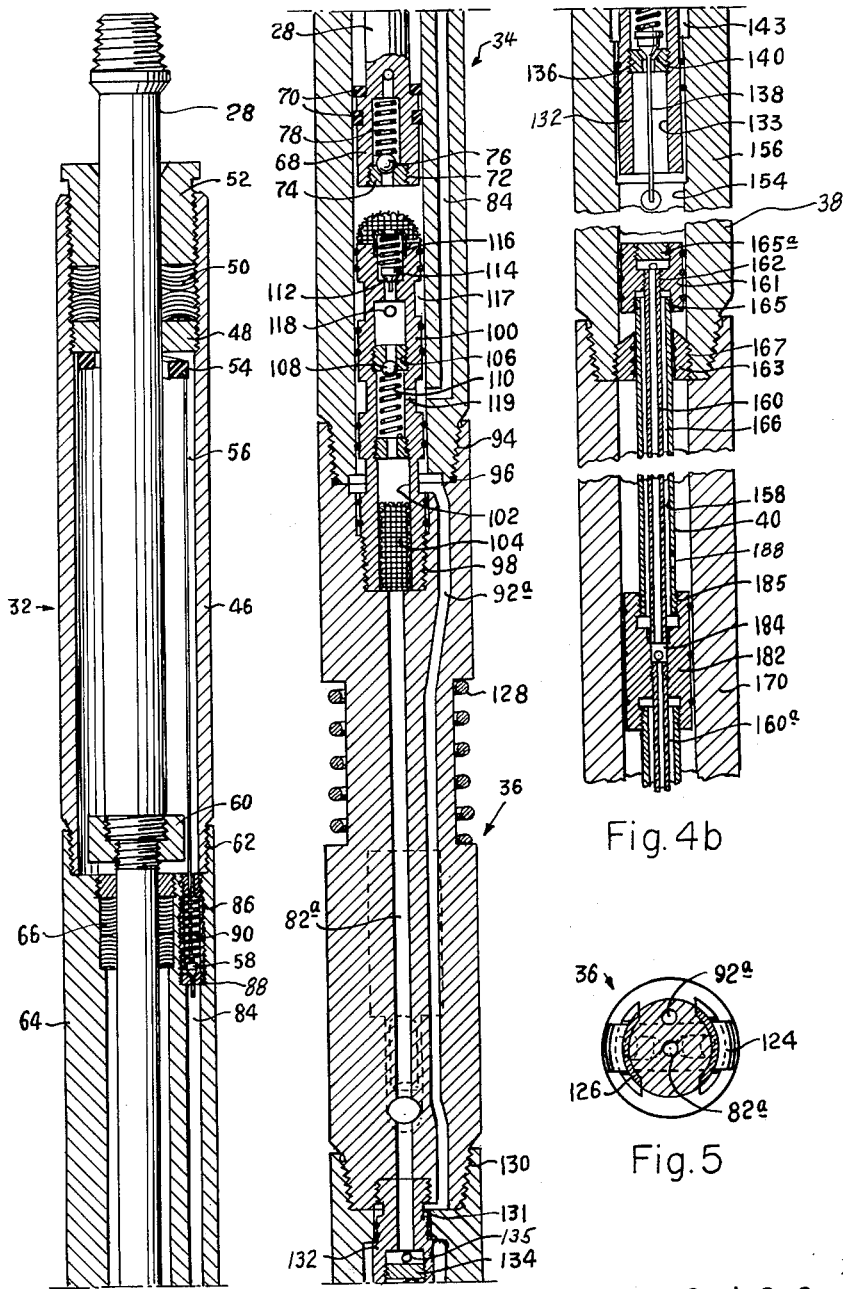

INVENTOR
Carl C. Crowell

ATTORNEY

3,016,954
Patented Jan. 16, 1962

3,016,954
WIRE LINE FISHING TOOL
Carl C. Crowell, Odessa, Tex., assignor of twenty-five percent to Wendell Coffee, Lubbock, Tex.
Filed Nov. 18, 1957, Ser. No. 697,064
2 Claims. (Cl. 166—98)

This invention pertains to fishing for objects which are stuck in the bottom of an oil well, and more particularly to a fishing tool which may be operated from a wire line and which anchors to the casing near the bottom of the well and draws the fish upward relative to the casing by hydraulic pressure.

In the production of petroleum, after casing has been set in a well, often objects get stuck in or near the bottom of the well. These objects may be screens, liners, pump parts, etc. Various fishing tools are known which may be lowered into the vicinity of the stuck object, the fish caught with a moving part, the tool itself anchored to the casing, and through hydraulic forces acting on a series of pistons in cylinders of the tool, the fish pulled relative to the casing. All of these tools have the limitation that they are designed only to work upon tubing. The reason for this is that either the fluid pressure itself is introduced through the tubing or that the rotation of the tubing is needed to control the various valves and other control elements in the tool.

I have invented a tool which may be operated from a wire line. This has the obvious advantage that it may be quickly lowered and removed from the hole.

An object of the invention is to provide a fishing tool for anchoring to a casing wall and freeing a fish by hydraulic pressure; solely operated and controlled from a single wire line.

Another object of this invention is to provide various releases and control devices, solely responsive to the force on the wire line so that the tool may be operated successfully.

Another object of this invention is to provide various safety devices so that regardless of what may happen at the bottom of the well, the tool may always be retrieved from the well.

Another object of this invention is to have a closed fluid system whereby only clean fluid is used in the hydraulic system, eliminating leaks and foreign matters in the various valves.

Still further objects are to achieve the above with a device that is sturdy, simple and reliable, yet cheap and easy to manufacture.

The specific nature of the invention as well as other objects, uses and advantages thereof, will clearly appear from the following description and from the accompanying drawing in which:

FIG. 1 is a schematic representation of the entire tool.

FIGS. 2, 2a and 2b is an axial sectional view of the tool proper.

FIG. 3 is a cross section taken on line 3—3 of FIG. 2.

FIGS. 4, 4a, 4b and 4c is an axial sectional view taken on a plane normal to the plane of FIGS. 2, 2a and 2b.

FIG. 5 is a cross section taken on line 5—5 of FIG. 2a.

Figure 4C:
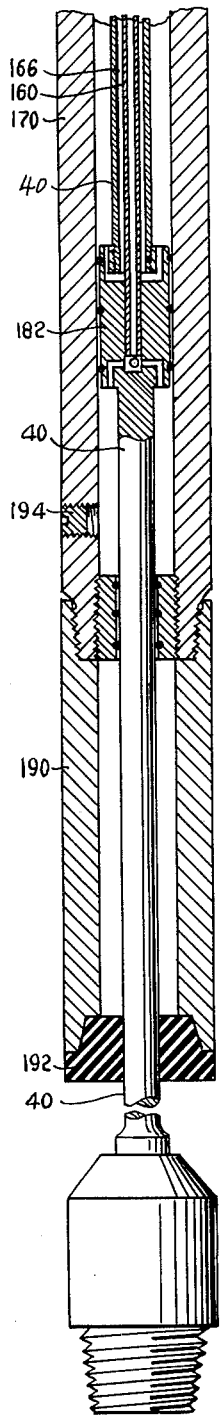

As seen in the accompanying drawings, one embodiment of this invention comprises a cable or wire line 20 connected through a conventional cable socket 22 to weights 24. Connected to weights are a set of jars 26. Jars are well known to the art and these are conventional hydraulic jars such as are well known. The bottom of the jars are connected to the pump piston rod 28. The pump piston rod itself extends into the tool proper 30. The tool proper comprises a surge section 32, pump section 34, anchor section 36 and a plurality or series of lifting cylinders 38. Below the tool proper extends the lifting rod 40 which is attached to a grapple 42 through a conventional bumper sub 44.

The surge section 32 has a tubular body 46. At the upper end of the tubular body, is a packing gland having a positive stop 48 which is rigidly connected by screw threads or welding to the tubular body 46. Above the positive stop 48 is packing 50 which is held in place by a conventional packing nut 52. Depending from the bottom of the positive stop is a washer 54. The washer 54 is spring biased away from the positive stop. This may be accomplished either by using that type of lock washer which consists of a single revolution of a resilient helix or by having a plain surfaced washer connected to the stop by conventional type compression springs. Connected to the washer is a relief valve rod 56 which depends downward to relief valve 58 (FIG. 4). An annular stop 60 protrudes from the pump piston rod 28 in the surge section. The bottom of tubular body 46 is screw threaded at 62 for connection to the pump section 34.

The pump section 34 also has a tubular body 64 which is connected to the tubular body 46 by the screw threads 62. At the upper end of the tubular body 64 there is a packing gland 66 which is packed with metalic packing, or other packing capable of withstanding hydraulic pressures in the order of two or three thousand pounds per square inch. The walls of tubular body 64 are particularly thick so that various bores may be made through it to provide fluid passages. On the lower extremity of the pump piston rod 28 is a pump piston 68. The diameter of the pump piston rod 28 is only slightly smaller than the diameter of the pump piston 68 so that only a small amount of fluid is pumped each time the pump piston rod is reciprocated. The pump piston has metalic packing 70 between it and the tubular body 64 which forms a pump cylinder. Also there is an opening 72 in the bottom of the pump piston. Into this opening is threaded a valve seat 74. A ball check valve 76 is biased downward by helical spring 78. The upper portion of opening 72 is connected by a fluid passage 80 to the annular space between the pump piston rod and the pump cylinder. As may be seen, with the other valves in the system, when the pump rod moves downward the valve 76 will open allowing fluid to flow through the passages 72 and 80 to above the piston 68. Then when the pump rod moves upward, the valve will close and fluid will be pumped upward. There is a high pressure passage 82 from the top of the cylinder immediately below the metalic packing 66. This high pressure passage 82 connects downward through the wall of tubular body 64.

Also extending parallel to the axis of tubular body 64 through the walls thereof is relief valve passage 84 (FIG. 4). The upper part of the relief passage is enlarged at 86. At the bottom of this enlarged portion is a valve seat 88. The relief valve 58 is seated therein and held in place by a spring 90. The parts are so proportioned and designed that when the pump piston 68 reaches the top of its stroke and contacts the packing gland 66, the stop 60 contacts the washer 54. Therefore, under normal operating conditions the stop will not push the washer upward and therefore will not open the relief valve. However, under special conditions the tension on the wire line 20 can be increased to a point where that the piston rod elongates enough to open the relief valve 58. It is contemplated that the diameter of the piston rod and the length between the piston and stop be made such that a force of approximately 3000 lbs. is required to elongate the rod sufficiently to open this valve.

There is a low pressure fluid passage 92, which is in the wall of the tubular body 64 parallel to the axis thereof. It opens into the annular portion above the packing gland 66 (referred to as the surge section 32). The lower end of this passage 92 opens at 93 into the bottom of the pump cylinder. It also extends downward.

The bottom of the tubular member 64 is threaded at 94 to connect the top of anchor section 36, the top of which is also threaded. O-ring type packing is used in numerous places in this device and will be referred to as O-rings. E.g. O-rings 96 seal the threaded connection 94. Coaxial with the body of anchor section 36 is a cylindrical opening 98 in the top thereof. The diameter of this cylindrical opening 98 is the same as the diameter of the pump cylinder. At the bottom of the opening 98 are threads into which is threaded a cylindrical member 100. Immediately above the threads are O-rings to seal the various fluid passages. The member 100 has a bore 102 through the axis thereof. On the lower end of the bore, is filter mesh 104. About midway of the bore is threaded a valve seat 106; immediately below the valve seat is a ball pressure check valve 108. The ball is spring biased upward by spring 110, the lower end of which rests upon a ledge in the bore 102. In the upper end of the body member 100 is a valve seat 112. A high pressure relief valve 114 rests above the valve seat and is spring biased downward by spring 116. The tension on the spring is such that if the pressure in the high pressure system exceed about 1800 p.s.i. the valve opens. As the upper end of the valve communicates with the lower end of the pump cylinder, when the high pressure relief valve 114 opens, it will release the pressure in the high pressure system.

The high pressure passage 82 opens through the inside wall of tubular body 64 at a point between the high pressure relief valve and the pressure check valve. The member 100 has annular groove 117 at this area. There is also an opening 118 through the side of member 100 so that the bore 102 is connected to the passage 82 at this point. There are O-rings above and below groove 117 to seal the high pressure section from the low pressure section. Passage 84 opens through the inside walls of tubular body 64 below check valve 108. A corresponding opening 119 in the member 100 provides communication with the bore 102 and passage 84. There are O-rings above and below an annular groove at this point to isolate the various pressure passages. The low pressure passage 92 opens to an annular space between body 64 and member 100 at the threads 94. The low pressure passage continues, being designated as 92a through the anchor section (FIG. 4a). This passage 92a is a bore through the wall of the anchor section 36 parallel to the axis thereof.

Within the anchor section 36, there are two cylindrical bores 120 at an acute angle to the axis thereof. The bottom of the bores 120 connect to a high pressure fluid passage 82a which extends down through the axis of the anchor section. A plunger 122 is snugly fitted within each bore 120. They are sealed with O-rings as shown. Connected above the plungers are slips 124 which ride on ways 126. The ways are at an acute angle to the axis of the tool so that when the slips are set, they prevent the anchor section from moving downward with respect to the casing. The slips are biased downward by a spring 128. As slips and ways are well known to the oil well servicing art they are not further described here. The bottom of the anchor section is threaded 130 to the lifting cylinder 38 immediately below it. In a similar manner as at threads 94, the high pressure passage 82a opens through the axis into a cylindrical member 132. And in a similar manner, the low pressure passage 92a opens into an annular space 131 between the anchor section and the cylindrical member 132 so that it continues on below.

The cylindrical body 132 has an axial bore 133 through it. About mid-point in the bore there is a plug 134 threaded to the bore. Just above this plug are a plurality of openings 135 which extend radially through the wall of body 132. Spaced below the plug 134 is flush valve seat 136 with flush valve 137 above it. The flush valve has a stem 138 depending below it and past the bottom of body 132. A plurality of tapered nozzles 139 angle inward and upward, entering the bore 133 just above seat 136. Adjacent and above the mating surface 140 of the flush valve 137, the valve has a quarter round annular groove 141. A very light spring 142 biases the flush valve downward. When the flush valve is closed, the pressure on top will keep it tightly sealed. When the valve is opened by upward movement of stem 138, fluid will rush from high pressure passage 82a, the upper portion of bore 133, passages 135, and annular space 143, through nozzles 139, forming a jet. This jet will impinge against the quarter-round area 141 so that the valve is held open so long as there is a pressure differential. When the pressure differential ceases to exist, spring 142 will close the valve. The high pressure fluid passage is designated as 82b below threads 130. It is a passage through the wall to the tube which extends parallel to it. The low pressure passage is designated as 92b and has an opening 152 into the central bore 154 of the tubular member 156.

The lifting rod 40 itself has a coaxial bore 158 extending through it. Within this coaxial bore is a tube 160 so that there are concentric fluid passages within the piston rod 40. Lifting piston 161 has a coaxial bore 162 through it. On either end of the piston are threaded counter bores 165. The tube 160 is threaded into bore 162. There is a passage 168 extending down from bore 162 to the bottom of the piston so that there is a fluid connection between the space below the piston and the inside of tube 160. The upper counter bore 165 is sealed with a plug 165a; lifting piston rod 40 is threaded into lower counter bore 165. Fluid passage 169 connects this lower bore 165 to above piston 161. At a point in body 156, just above packing join 163, there is an opening 164 through the wall of 156 connecting high pressure passage 82b below piston 161. Therefore, it may be seen that the interior of the tube 160 is in communication with the high pressure passage 82, whereas the annular area 166 between the tube and the lifting rod is in communications with the low pressure passage 92. The tubular member 156 has screw threads on its lower section by which it is connected to another tubular member 170. The bottom of member 156 has internal threads 167 into which is screwed annular packing joint 163. The packing joint forms a tight seal with the rod by use of O-rings. Within the annular joint 163 are two radially biased balls (not shown). These balls fit into detents in the lifting rod 40b so that it is releasably held in a fixed position while being lowered into a well.

Lifting rod 40 is screwthreaded into a top counter bore 185 of lifting piston 182. The lifting piston has a snug fit with the cylinder 170 and there are O-rings on the piston to form a fluid seal. The piston has an axial bore 184. The tube 160 extends down into bore 184 a certain distance. There are O-rings between the tube and the piston to form a fluid seal. There is a passage 186 which connects the center of the bore to the bottom of the piston. Therefore, the high pressure passage 82 is connected through the center of the tube to below the lifting piston 182. Another lifting rod 40 is screwed into the bottom of the lifting piston 182. Again, tube 160a extends into the bore 184 of the lifting piston and is tightly screwed into place so that there is a continuous fluid passage from tube 160 through the entire lifting section. There is a hole 188 communicating from its inner bore 158 to the outside of the rod just above the piston 182. There is a passage 189 drilled through the piston from upper counter bore 185 to the lower counter bore. Therefore, it may be seen that the low pressure passage 92 is connected between the annular space of the lifting rod and the tube to above the lifting cylinder.

The bottom of cylinder 170 is threaded to connect to another like cylinder. Another packing joint 163 is in the bottom thereof. Likewise, the rod 40 is connected to a like lifting piston within the second lifting cylinder. As many lifting sections comprising of a cylinder 170 and piston 182 may be used as are necessary. I find that four or five are adequate.

The lowermost piston 182 has a solid lifting rod 40 connected to it. The lowermost cylinder has a tube 190 connected to it. On the bottom of the tube there is a wiper 192 for the purpose of cleaning dirt and grit from around the piston rod 40. It also tends to centralize the rod in the cylinders. As mentioned before, on the bottom of the lifting rod 40 is a conventional set of bumper subs 44 and a conventional grapple 42.

*Operation*

The first step in the operation of the tool is to lower it into the well on the end of a wire line in the position as shown until the grapple contacts the fish. Then the tension is increased upon the wire line or cable so that the tool tends to move up and the grapple catches the fish. The tension on the wire line is rapidly increased to about 5000 lbs. until the jars 26 go off and the grapple is firmly set into the fish. After this, the tension is again released so that the weights 24 cause the pump piston to go down, then the tension of the wire line is increased causing it to rise. In short, the wire line is reciprocated causing reciprocation of the pump piston which causes a pumping of the pressure and increasing the pressure in the high pressure passage 82. As explained before, the first thing occurring as the pressure in 82 is increased, is that the plungers 122 move upward and outward setting the slips 124 in the casing wall. This prevents the tool as a whole from moving downward relative to the casing. As the piston 68 continues to reciprocate, this continued pressure acting beneath the lifting pistons cause them to move upward relative to the tool which is fixed to the casing. This upward movement is transmitted by the lifting rod 40 to the fish causing the fish to move upward also.

When the top of the lifting piston 161 contacts the depending rod 138 of the flush valve, it will open the flush valve permitting high pressure fluid to flow from the passage 82b into the bore 154 which is connected to the low pressure passage. This contact of piston to rod 138 will occur on an upstroke of the wire cable 20 and piston 68. Continued tension on the cable will continue to cause fluid to flow by the flush valve 137 maintaining it in the open position. When the pressure in passage 82 is relieved, the spring 128 will release the slips 124 and the pull of the wire cable transmitted from the top of piston 68 through the packing 66 will cause the tool as a whole to move upward, whereas the lifting pistons in the lifting rod will remain stationary. When the lifting pistons contact the annular packing joints 163, continued tension on the wire cable will also move the lifting piston and rods upward if the fish is free. I.e. if the fish is now free, the continued tension of the cable will remove the tool with the fish attached. If the fish is not free, when the bottom of the lifting piston contacts the top of annular member 163, there will be a very large tension occur on the wire cable. The operator at the top of the ground will notice this and know that the fish is not yet free. Therefore, they can release the pressure on the cable. Friction of the various O-rings will hold the lifting rod in the extended position and the pumping piston 68 will move down in the pumping cylinder. When the pumping piston strikes bottom, the operator at the top of the ground will notice this and again begin reciprocating the wire line and pump piston. The cycle is therefore repeated until the fish finally comes free at the end of some pumping cycle.

If, for some reason, the tool appears to be stuck in the bottom of the well, there are numerous ways that it can be released. By increasing the tension in the cable, the pump rod 28 elongates sufficiently to open valve 58. This will release the pressure behind the slip 124. Then increased tension will cause the jars to go off which will jar the tool loose from the slips 124. Then by sharply releasing the cable, the bumper sub 44 can be bumped. Continuation of the bumper sub being bumped will cause the fish to be bumped loose from the grapple. Once the fish is free from the grapple and the slips no longer set, the tool can be removed from the well. If this fails, there is also included a safety blow-out disk 194 in tubular member 170. If nothing else gives, continued reciprocation of the pump piston will build the pressure so great in the high pressure system that the blow-out disk will fail. Once it has failed, this releases the pressure behind the slips 124 and the tool can be removed as described above. To have the safety blow-out disk provide this safety factor, it may be necessary to eliminate pop valve 114 and replace it with a solid disk.

It will be apparent that the embodiments shown are only exemplary and that various modifications can be made in construction, materials, and arrangement within the scope of the invention as defined in the appended claims.

I claim as my invention:

1. A wire line fishing tool comprising the combination of a set of jars; a flexible line; means for connecting said line to said jars; a pump rod depending from said jars; a pump piston attached to the lower end of said pump rod; a pump cylinder surrounding said pump piston; fluid filling said cylinder; a spring biased check valve in said pump piston; a hollow member attached to the pump cylinder forming a surge space; means attached to the pump cylinder for anchoring the pump cylinder to a surrounding casing; a lifting cylinder attached to the pump cylinder; a lifting piston in said lifting cylinder; the lifting rod depending from said lifting piston; an annular packing joint at the bottom of said lifting cylinder forming a fluid tight joint between said lifting cylinder and said lifting rod; a plurality of lifting cylinders connected in series below said first mentioned lifting cylinder; a plurality of lifting pistons, each lifting piston in a separate lifting cylinder; the bottom of each lifting cylinder having a fluid tight seal between the lifting cylinder and the lifting rod; said lifting rod extending below all the lifting cylinders; a bumper sub connected to the bottom of the lifting rod; a grapple connected to the bottom of the bumper sub; a high pressure fluid passage adapted to carry high pressure fluid extending within the walls of said pump cylinder and within the walls of said first mentioned lifting cylinders and connected into the top of said pump cylinder and into the bottom of said first mentioned lifting cylinder; a spring biased check valve in said high pressure fluid passage, the location of said check valve being below said pump piston; a low pressure passage adapted to carry low pressure fluid extending in the walls of said pump cylinder, said low pressure passage connecting into said hollow member forming a surge space, said low pressure passage connecting into the bottom of said pump cylinder, said low pressure passage connecting into the top of said first mentioned lifting cylinder; a relief passage extending within the walls of said pump cylinder and connecting into said high pressure fluid passage below said check valve within said high pressure passage, said relief passage connected into said hollow member forming a surge space; a normally closed valve in said relief passage; means interconnecting said valve and said pump rod for opening said valve in said relief passage responsive to tension in said pump rod; a flush valve located within said first mentioned lifting cylinder walls immediately above said lifting cylinder; said flush valve located within a chamber, the chamber inlet from said lifting cylinder, said chamber having a plurality of nozzles connecting said high pressure passage and said chamber; a rod depending from said flush valve through said inlet into the top of said first mentioned lifting cylinder so that when said lifting piston reaches the top of its stroke it opens the flush valve; said nozzles being so arranged and constructed that when said flush valve opens the fluid rushing from the high pressure passage through the nozzles direct a fluid jet against the valve holding it open so long as the pressure in the high pressure fluid passage exceeds the pressure in the low pressure fluid passage; a first fluid passage extending through the lifting rod, said first fluid passage opening through each of said lifting pistons to the space below of each said lifting pistons; a second fluid passage through the lifting rod, said second fluid passage opening into the space above each of said lifting pistons.

2. A fishing tool comprising: a vertically disposed tube; the tube forming a plurality of coaxial lifting cylinders; a rod partially within the tube, the rod coaxial with the tube; the lower end of the rod extending below the tube; means for grappling a fish on the lower end of the rod; a plurality of lifting pistons on the rod, each lifting piston acting in one of the lifting cylinders; means attached to the tube for anchoring the tube to a surrounding casing; a pump cylinder attached to the top of the tube; a pump piston in the pump cylinder; means for exerting vertical force on said pump piston attached to said pump piston; fluid coupling means full of fluid for connecting the output of the pump cylinder to beneath each of the lifting pistons in the lifting cylinders, said fluid coupling means being attached to the tube; check valve means in the fluid coupling means for prohibiting reverse flow from beneath the lifting pistons of the pump; means responsive to vertical force on said pump piston for actuating said means for anchoring; and means in the fluid coupling means for releasing fluid pressure in said fluid coupling means including: a flush valve in a chamber in the tube, the outlet of said chamber being a low pressure space, the outlet of such chamber normally being closed by said flush valve, a rod attached to the low pressure side of the valve, the position of the rod being such that as the lifting piston approaches the top of its stroke the rod is contacted by the lifting piston, the rod then opening the valve, and nozzles connecting said fluid coupling means and said chamber, said nozzles directed on the valve in a direction tending to open said valve; so constructed and arranged that when the valve is open it remains open so long as pressure on the high pressure side materially exceeds the pressure on the low pressure side.

References Cited in the file of this patent

UNITED STATES PATENTS

| | | |
|---|---|---|
| 1,399,108 | Garrison | Dec. 6, 1921 |
| 2,253,092 | Pranger | Aug. 19, 1941 |
| 2,332,749 | Page | Oct. 26, 1943 |
| 2,474,453 | Armitage | June 28, 1949 |
| 2,715,943 | True | Aug. 23, 1955 |
| 2,829,716 | Stewart | Apr. 8, 1958 |
| 2,846,015 | Pittman | Aug. 5, 1958 |